(12) United States Patent
Pick et al.

(10) Patent No.: US 7,764,831 B1
(45) Date of Patent: Jul. 27, 2010

(54) SYSTEM AND METHOD FOR CREATING, SELECTING AND MATCHING A STAIN COLOR FOR WOOD

(76) Inventors: Randal Pick, 650 Poydras St., Suite 2400, New Orleans, LA (US) 70130;
Timothy Kolesa, 650 Poydras, Suite 2400, New Orleans, LA (US) 70130

( * ) Notice: Subject to any disclaimer, the term of this patent is extended or adjusted under 35 U.S.C. 154(b) by 1107 days.

(21) Appl. No.: 11/279,233

(22) Filed: Apr. 10, 2006

(51) Int. Cl.
*G06K 9/00* (2006.01)

(52) U.S. Cl. .................................................. 382/162

(58) Field of Classification Search ........... 382/162–67; 345/589–604; 700/95–98, 117, 122, 130–33; 715/700, 848
See application file for complete search history.

(56) References Cited

U.S. PATENT DOCUMENTS 6,892,105 B2 * 5/2005 Draughn et al. ............... 700/97
7,016,747 B1 * 3/2006 Ninomiya .................... 700/97
7,043,701 B2 * 5/2006 Gordon ....................... 715/848

* cited by examiner

*Primary Examiner*—Sherali Ishrat
(74) *Attorney, Agent, or Firm*—Andrew G. Vicknair

(57) ABSTRACT

A method and system are disclosed for creating, selecting and/or matching a stain color for wood. A user can create various colors by adding or reducing the amount of a particular color to the color that a user is creating. After a color is created, a new image can be created that illustrates the created color. When a user is satisfied with the created color, the created color can be applied to the wood so that an image of the wood stained with the created color is created for the user to view. The effects that the wood grain patterns of the wood have on the stained wood are illustrated in the image of the stained wood. The created color may be stored so that it can be accessed at a later time. In addition, any created color may also be communicated to others whereby others may use the created color as specified by a user of the system and method that created the color.

29 Claims, 9 Drawing Sheets

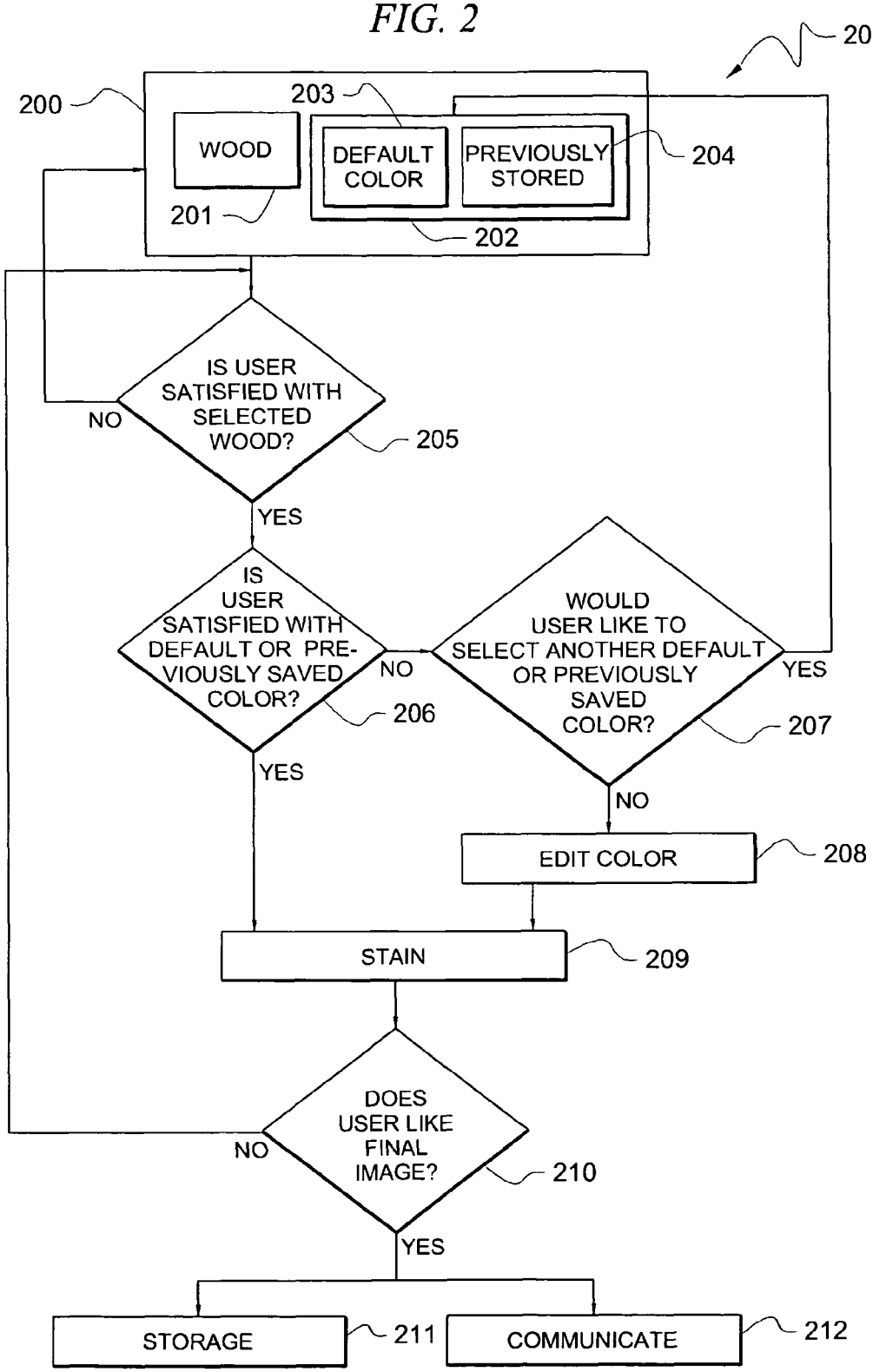

SYSTEM AND METHOD FOR CREATING, SELECTING AND MATCHING A STAIN COLOR FOR WOOD

TECHNICAL FIELD

The present invention relates, in general to color matching systems and methods, and more specifically to the creating, selecting and/or matching of stain colors for wood.

BACKGROUND OF INVENTION

Decorating houses, offices, and other areas, both interior and exterior, has taken place for a number of years. A major part of decorating is choosing the layout of an area, determining how items are arranged, and selecting appropriate colors for the boundaries and the various items located inside the boundaries for the areas to be decorated. When a room is decorated, several colors may be chosen. One or more colors may be chosen for the walls, ceilings, floors, and doors of the room, another color may be chosen for the furniture to be placed in the room, and other colors may be selected for various decorative accessories, such as vases, curtains, paintings, and the like. In addition, decorators may also select a color for trim work, such as baseboards, crown moulding, chair moulding, interior doors, corbels, onlays, switch plates, window trimmings, ceiling medallions, appliqués, corner and plinth blocks and the like.

Selecting colors may be a difficult task depending on the type of material. In fact, the type of material may dictate what substance or finish is used to apply color. Often, individuals deal with choosing and selecting of paint and/or stain colors when decorating items, such as bedrooms, bathrooms, offices, schools, hospitals, and the like. When it comes to decorating, choosing colors can really be a challenge. While an individual may feel that there are so many choices, the individual is bound to find the right color; thus, one may end up feeling that there are so many choices, but where does one start. It is great for individuals/decorators to collect paint chips and/or stain samples when planning a color scheme for a room, but final decisions are often not made until an overall room scheme is developed. While paint, stain, and other coloring substances are often available in literally an infinite array of colors, difficulty often arises when an individual has to match a color to an item that has various factors that alter the color after it is applied to the item. For example, choosing a color for wood is difficult as individuals fail to take into account the type of wood and the affect that the wood grain has on the color. For example, when an individual selects a stain color for wood based items, such as doors, cabinets, office furniture, office cubicles, and the like, the final color does not always match the originally selected color as the type of wood and wood grain can affect the final appearance of the wood item.

The components of paint may also present a problem when selecting colors. Paint is a substance consisting of two things, pigment and binder. Pigment is what gives color to paint and in its raw form it is a fine powder. Binder is what holds the pigment and adheres it to a surface. The pigment particles are insoluble and merely form a suspension in the binder. Paint may be appropriate for a variety of walls, such as sheetrock, plaster, cinder block, concrete and the like while a different substance or finish, such as an oil or water-based stain, is appropriate for items made of wood. Stain is a type of paint that is very thin, that is, low in viscosity, and formulated so that the pigment penetrates the surface rather than remaining in a film on top of the surface. Stain is predominantly pigment or dye and solvent with little binder, designed primarily to add color without providing a surface coating. An individual must also take into account the differences between paint and stain when choosing a color and deciding to use either paint or stain.

Difficulty in selecting colors also arises when an individual selects an item, such as a door or piece of furniture, and a color for the item from a catalogue or web site without actually seeing the item in the selected color in person. Often the individual that selected the item from the catalogue or website is disappointed with the actual appearance of the item as the item's color and final appearance often does not appear to be what the individual had in mind.

Accordingly, a need exists in the art for a system and method that allows individuals to select a color for a wood based item and can provide the individual with an image of the wood based item after the selected color has been applied to the item whereby the system takes into account the type of wood and any affects that wood grain will have on the overall appearance of the item.

BRIEF SUMMARY OF THE INVENTION

The present invention is directed to a system and method for creating, selecting and/or matching a stain color for wood. In one embodiment of the present invention, the system and method may present an image of wood to a user, such as a digital image, an image comprised of visual information stored by or on a computer or electrical device, and the like. After the image of wood is presented to a user, the user may be presented with a plurality of selectors allowing the user to create and/or select a color for a stain. The system and method may then apply the color created and/or selected by a user to the image, illustrating the created and/or selected stain color applied to the wood, and present the image of the stain color applied to the wood to a user.

In creating the new image after a user has created and/or selected a color, the present invention takes into account any affects that the wood, such as the nature of the wood grain, may have on the final appearance of the wood. The present invention provides the user with an image that illustrates the affects that wood will have on a user's created and/or selected color. Thus, the new image displays an image of wood after the created and/or selected color has been applied to the wood. The system may also allow a user to view multiple images of wood after the created and/or selected color has been applied.

After the new image has been generated and presented to the user, the system and method presents the user with a chance to save the created and/or selected stain color. If the user chooses to save his/her created and/or selected stain color, the created and/or selected color may be saved in a electrical format, such as a digital form, a format readable by a computer, a format stored by or on a computer or other electrical device, and the like and the present invention may also allow the user to send the saved color to another individual through an email. In addition, the system and method may also take the value, such as a digital or electrical value that can be stored on or by or read by a computer or electrical device, of the color created and/or selected by a user and use it to create a paint, stain, pigment, dye, and/or other coloring substance that is the same color that the user created and/or selected.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 2 illustrate a flowchart illustrating example steps implemented in creating, selecting or matching a stain color for wood;

DETAILED DESCRIPTION OF THE INVENTION

Figure 1:
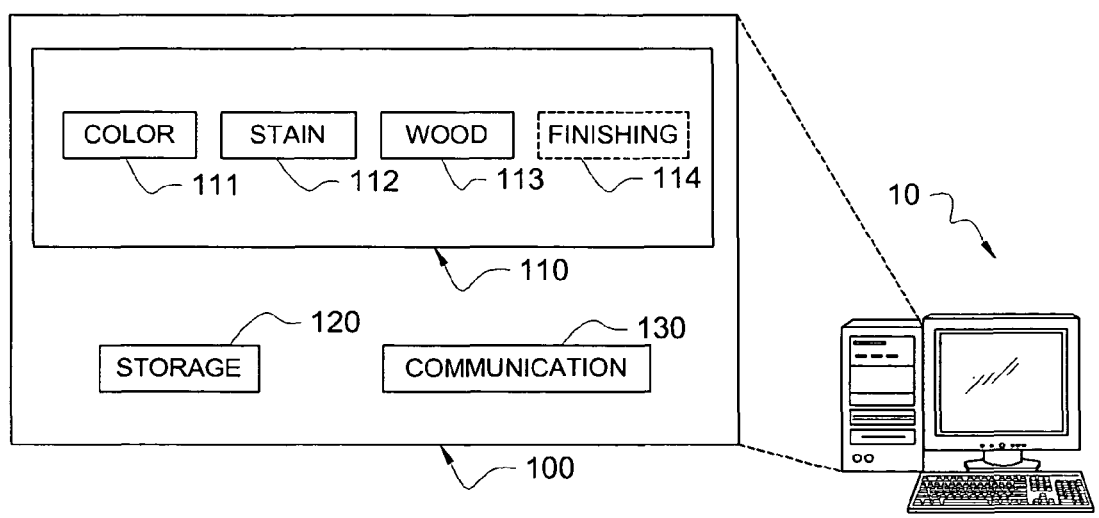
FIG. 1 is an illustration of a general architecture of a system of one embodiment of the present invention.

FIG. 1 is a diagram illustrating creation-selection-matching environment 100 implemented on computer 10 for creating, selecting or matching a stain color for wood according to one embodiment of the present invention. A stain color for wood may be created, selected or matched by applying a created and/or selected stain color to an image of wood, or digitally staining the wood, and then analyzing the created and/or selected color and wood and viewing the generated image of wood that illustrates the created and/or selected color applied to the image of wood. The generated image may be in the format of a digital image, an image comprised of visual information stored by or on a computer or electrical device, and the like. In addition to creation-selection-matching environment 100, the computer system to may include an operating system, a computer's coordinating program that is built on the instruction set for a processor or microprocessor, and the hardware that performs the logic operations and manages the data movement of the computer.

Creation-selection-matching environment 100 represents one application running on computer 10. In one embodiment of the present invention, creation-selection-matching environment 100 includes image module 110, storage module 120, and communication module 130. Image module 110 may also include color sub-module 111, stain sub-module 112, and wood sub-module 113. Creation-selection-matching environment 100 is advantageous as it may be used at least to match stain colors for wood, wood based items, such as doors, office furniture, plywood, cabinets, office cubicles, office workstations, and the like, to select stain colors for wood, to create stain colors for wood, to generate images of wood after a created and/or selected color has been applied to the wood, to save new stain color data, and to utilize the saved stain color data in the creation of wood stain. For example, creation-selection-matching environment 100 may be used to create and/or select a stain color, apply the created and/or selected color to raw wood or stain the wood, such as digitally stain the wood and view the raw wood after the created and/or selected color has been applied to the raw wood or after the raw wood has been stained. The use of the terms 'digitally stained' does not limit the present invention to the generation of digital images, but is used to merely imply that the wood has been stained through a computer or other electrical device. When the raw wood is digitally stained, or when the created color is applied to the image of the raw wood, creation-selection-matching environment 100 will take into account the wood grain and any/all wood grain characteristics of any type of raw wood selected and generate an image, such as digital image, an image comprised of visual information stored by or on a computer or electrical device, and the like, that illustrates the created and/or selected color applied to raw wood whereby in the process of generating the image, the affects that wood grain may have on the final appearance of the created and/or selected color applied to the raw wood have been considered. If a user decides to change a color after previewing the image of the stained wood, the present invention may operate so that the image is automatically adjusted to account for wood characteristics, such as wood grain, and to account for any changes in color that a user has made.

Image module 110 generates images of raw wood, images of colors, such as images of user created and/or selected colors, and images of the raw wood after the created and/or selected color has been applied to the wood or after the raw wood has been stained. Generating images of colors that are created and/or selected by a user is accomplished through color-sub-module 111. Generating images of raw wood is accomplished by wood sub-module 113. Generating images of the raw wood after the user created and/or selected color has been applied to the raw wood or after the raw wood has been stained is accomplished through color sub-module 111, stain sub-module 112, and wood sub-module 113.

In one embodiment of the present invention, color sub-module 111 may be configured so that several colors are available for the user to select as a default color. After a user selects a default color, a user may then edit the default color until the user creates a color that satisfies the user. Default colors presented to a user may be any number of colors. In one embodiment, color sub-module 111 presents colors that are commonly used for coloring or staining wood, such as cherry, ginger, honey, pecan, wine, etcetera. Color sub-module 111 may also present a user with colors that were previously created and stored by the same user, popular colors created by other users, etcetera. For example, popular colors such as cherry may be presented to the user so that a user is given the chance to simply choose a popular color and avoid the process of actually creating a color by editing a color until a satisfactory color is created by the user.

In another embodiment, color sub-module 111 displays colors that may be created, selected or changed by a user. A default color, such as white, may be originally displayed to a user by color sub-module 111. However, the present invention is not limited to displaying such a default color as any color from a number of colors may be presented to a user as the default color. Color sub-module 111 may also be configured to allow a user to edit the default color by allowing a user to change the magnitude of a value for a particular elemental color that is a part of the currently displayed color. Thus, in one embodiment of the present invention, a user can choose to increase the amount of a particular elemental color or decrease the amount of a particular elemental color which results in editing the default color originally presented to a user. For example, if the default color or selected color displayed to a user is white and a user wants to add additional shades of red to the default or originally selected color, the user would increase the magnitude for the elemental color red so that additional shades of red would be added to the originally selected color. As the user increases the magnitude for elemental color red, the displayed color will continue to change and reflect the additional amount of red added by a user as long as the user is changing the magnitude of the elemental color red. The present invention may be configured to allow a user to edit a default color by adding any number of elemental colors to the default or selected color by increasing the magnitude of an elemental color, such as red, blue, green, yellow, cyan, etcetera, that is added to the default or selected color, until the user has created a color or matched a color that satisfies the user.

Color sub-module 111 may also allow a user to further edit a color by changing the opacity of a color, the intensity of the color, or any combination thereof. In allowing a user to change the opacity of a color, color sub-module 111 allows a user to visualize the changes of stain applied to raw wood when editing opacity and intensity values for the stain applied to the raw wood. The present invention takes into account the fact that the final appearance of wood after it is stained will vary depending on the actual makeup of the stain. Some stains are made from pigments, some stains are made from dyes, and some stains are made from a blend of dyes and pigments. Pigmented stains tend to be opaque and hide some of the grain and figure characteristics of the wood while dye stains tend to enhance the wood grains and figure characteristics of the wood. Color sub-module 111 enables a user to visualize the results of adding pigments to a stain by allowing the user to adjust the opacity of a color. In addition, color sub-module 111 enables a user to visualize the results of adding dyes to a stain in allowing the user to adjust the intensity of a color.

Generating images of raw wood is accomplished by wood sub-module 113. In one embodiment of the present invention, wood sub-module 113 generates images of raw wood and presents the raw wood images to a user before a user created and/or selected stain color has been applied to the wood. The images of raw wood presented to a user may be any number of raw wood images, such as birch wood, cherry wood, cypress wood, mahogany wood, maple wood, red oak wood, walnut wood, white oak, etcetera. Wood sub-module 113 may also be configured so that it presents a user with images of any wood-substitute items, such as press board and the like, that are used instead of solid wood. In one embodiment of the present invention, an image of raw wood is generated as soon as a user selects a type of wood. The present invention may also be configured so that any number of raw wood images is presented to a user at one time. For example, if a user wanted to look at an image of both raw cypress wood and raw mahogany wood, wood sub-module 113 can present multiple raw wood images to a user so that the user can simultaneously view more than one image of raw wood.

Illustrating the raw wood after the user created and/or selected color is applied to the raw wood is accomplished by stain sub-module 112. Stain sub-module 112 may stain the raw wood with the color that was created and/or selected by a user. After the raw wood has been stained, an image, such as a digital image, an image comprised of visual information stored by or on a computer or electrical device, and the like, of the stained wood is generated and presented to a user. In generating the image of the stained wood, stain sub-module 112 takes into account any changes that the wood grain may have on the final appearance and allows a user to view the wood after it has been stained with the user's color. The present invention may also be configured so that the image of stained wood is automatically monitored and will be automatically adjusted as soon as a user begins to create and/or select or match another color. In automatically adjusting the image of stained wood, the present invention may also accommodate for any wood grain characteristics of the wood that may affect the final appearance of the stained wood. Generating the image of the stained wood is advantageous as it provides a user with the opportunity to see the wood stained without anyone having to actually stain the wood. Thus, a user can determine if he/she approves of the image of the stained wood without having to worry about time and money spent on purchasing stains and dyes and actually staining the wood.

By instantly generating an image of the stained wood, a user can quickly and easily make a decision as to whether or not the user is satisfied with the final image of the wood. If a user is not satisfied with the final image, image module 110 allows a user to return to adjusting the user's previously created and/or selected color including the opacity and intensity of the color through color sub-module 111. The user may also select another type of raw wood through wood sub-module 113. When the user has created and/or selected another color and either selected another type of wood or kept the same wood selection, image module 110 can generate a new image illustrating the final appearance of the stained wood according to the user's changes. Thus, the user is instantly able to view his/her selections to determine if the user's changes are satisfactory. This process can be repeated as many times as needed until a user achieves a satisfactory color and wood combination.

Although FIG. 1 illustrates image module 110 with only three sub-modules, color sub-module 111, stain sub-module 112, and wood sub-module 113, the present invention is not limited to this configuration. In alternative embodiments of the present invention, image module 110 may include several other modules in addition to sub-modules 111, 112, and 113. For example, image module 110 may also include finishing sub-module 114 to illustrate the changes that various finishing steps, such as a final surface treatment that may protect the stained wood and enhance the appearance of the wood, may have on the stained raw wood. Similar to color sub-module 111 and stain sub-module 112, finishing sub-module 114 may present several finishing options, such as application of a clear finish, making the raw wood uneven, intentionally aging the wood before it is stained, etcetera, to a user so that a user can select a finishing option of his/her liking. After a finishing option has been selected and applied by a user, finishing sub-module 114 may generate a new image of the stained wood that will illustrate the affects that the selected finishing option has on the appearance of the stained wood.

Storage module 120 enables the saving and storing of user selections. After a user has created and/or selected or matched a stain color that is satisfactory, storage module 120 allows the user to save his/her created and/or selected color. Storage module 120 may also allow a user to save a stain color-wood combination and identify the stored data with various identifiers, such as a user's name, address, telephone number, job description, customer number, etcetera. Storage module 120 can store the user's stain data so that the user can return and choose the saved stain color at a later time. For example, when a user is opening a law office and uses the present invention to create a user specific stain color for all the doors of the office, the user can store the user specific stain color so that if the user specific stain color is needed in the future, the user can simply use the present invention to retrieve the stored stain color.

Communication module 130 enables a user to communicate with others in using the present invention. In one embodiment of the present invention, this is accomplished by communication module 130 handling any user data, such as a user specific stain color created by the user, and transport that data to third parties. Communication module 130 may communicate user data to third parties by, sending an electronic message, sending an email, sending an Short Message Service (SMS) message, sending a text message, instituting a telephone call, sending out a radio signal, any combination of the above, and the like.

In one embodiment, the present invention may be utilized by a customer and manufacturer, such as a manufacturer of wood based items such as doors, furniture, baseboards, crown moulding, chair moulding, corbels, onlays, switch plates, window trimmings, ceiling medallions, appliqués, corner and plinth blocks and the like, to assist the customer and manufacturer in the ordering and selection process. For example, the manufacturer can make the present invention available to its customs so that customers can create, select or match colors, such as a stain color, and select a type of wood and view images of the wood after the customer created and/or selected color has been applied, or after the wood has been stained, as discussed above, until a suitable stain color is created and/or selected by the customer. The customer may then send the manufacture a message, such as an email, that informs the manufacture of the customer specific stain color and type of wood to use for an item that the customer is ordering from the manufacturer.

In one embodiment, the present invention may be configured so that creation-selection-matching environment 100 also includes additional modules that may be used to run other processes or machines utilized in creating liquids used for coloring items, such as paints, stains, and the like. For example, in one embodiment, the present invention may be configured so that after a user has created and/or selected or matched a stain color that is satisfactory to the user, creation-selection-matching environment 100 can communicate the data making up the created and/or selected or matched stain color to another computer or machine which may receive the communicated data and use that data to create a wood stain or other coloring liquid that matches the color that was created and/or selected or matched by the user.

The program code segments making up creation-selection-matching environment 100 can be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, and erasable ROM (EROM), a floppy diskette, a compact disk CD-ROM, an optical disk, a hard disk, a fiber optic medium, a radio frequency (RF) link, etcetera. The computer data signal that can propagate over a transmission medium such as electronic network channels, optical fibers, air, electromagnetic, RF links, etcetera. The code segments may be downloaded via computer networks such as the Internet, Intranet, and the like.

FIG. 2 is a flowchart illustrating steps implemented in creating, selecting or matching a stain color for wood according to one embodiment of the present invention. Flow 20 represents a method for creating, selecting or matching a stain color for wood. Image generating is activated in block 200. In block 201, images of raw wood are selected and presented to a user. In block 202, a default color or a previously stored color may be selected and presented to a user. A default color is selected and presented to a user in block 203. The default color may be any number of colors, such as colors that are commonly used for coloring or staining wood, such as cherry, ginger, honey, pecan, wine, etcetera. A previously stored color may be selected and presented to a user in block 204. The colors that may be presented in block 204 may be colors that were previously created and stored by the same user, colors previously created by other users, colors that are popular in a particular area of the world, colors that are popular with a particular type of wood, etcetera.

After block 200, flow 20 proceeds to query block 205. In block 205, a query is done to determine if the user is satisfied with the raw wood that is selected. If the user is not satisfied with the selected raw wood, flow 20 will flow back to block 201 so that the user can select another raw wood. If a user is satisfied with the raw wood, then flow 20 will proceed to query block 206. In block 206, a query is done to determine if the user is satisfied with the default or previously saved color. If a user is satisfied with the default or previously saved color, then flow 20 will proceed to stain block 209. If a user is not satisfied with the default or previously saved color, then flow 20 will proceed to query block 207. In query block 207, a query is done to determine if a user would like to select another default or previously saved color. If a user would like to select another default or previously saved color, then flow 20 will flow back to block 202.

If a user would not like to select another default or previously saved color, then flow 20 will proceed to block 208. In block 208, the default color or previously saved color selected by the user will be edited by the user. The user can edit the color by changing the magnitude of value for a particular elemental color that is a part of the displayed color. Thus, in one embodiment, a user can choose to increase the amount of a particular elemental color or decrease the amount of a particular elemental color, such as red, blue, green, yellow, cyan, etcetera until the user has created a color that satisfies the user. In another embodiment, the user may also be able to edit the opacity of a color, the intensity of the color, or any combination thereof. When a user is finally satisfied with a color, flow 20 will proceed to block 209.

In block 209, the user created color, the default color, or the previously saved color that has satisfied the user will be applied to the selected wood, or the selected wood will be stained with the user created and/or selected color. Once the wood has been stained with the user's color, an image of the stained wood is generated, such as a digital image, an image comprised of visual information stored by or on a computer or electrical device, and the like, and presented to the user so that a user can view the stained wood. Generating the image of the stained wood is advantageous as it provides a user with the opportunity to make a decision as to whether or not the user is satisfied with the final image of the wood without having to actually mix any stains or colors or physically stain different types of wood. In one embodiment, the process of staining the wood may include the step of finishing the wood after it has been stained. For example, after the wood has been stained, a user may choose to view the stained wood after it has been finished or undergone any number of various finishing steps, such as the application of a final surface treatment that may protect the stained wood and enhance the appearance of the wood. Accordingly, block 209 may generate another image, such as a digital image, an image comprised of visual information stored by or on a computer or electrical device, and the like, of the stained wood that illustrates what the wood looks like after it has undergone a finishing step.

After the wood has been stained and/or finished, and an image of the stained wood has been generated and presented to a user, flow 20 will proceed to query block 210. In block 210, a query is done to determine if the user is satisfied with the final image or appearance of the stained wood. If the user is not satisfied with the final appearance of the stained wood, flow 20 will flow back to query block 205. If the user is satisfied with the final appearance of the stained wood, flow 20 will proceed to block 211 and block 212. In block 211, the color that the user is satisfied with may be stored. In storing data, the present invention may save a user's stain color and/or a user's stain color-wood combination and identify the stored data with various identifiers, such as a user's name, address, telephone number, job description, customer number, etcetera.

In block 212, various data associated with a finalized stain color can be communicated with others. After a user is satisfied with a stain color, the user can choose to have the stain color and other related data communicated to others. For example, in one embodiment, user specific data such as, user specific stain color, user identification data, notes input by a user, and the like can be communicated to others in a variety of methods, such as an electronic message, sending an email, sending an Short Message Service (SMS) message, sending a text message, instituting a telephone call, sending out a radio signal, any combination of the above, and the like.

Although FIG. 2 illustrates flow 20 as comprising steps implemented in creating, selecting or matching a stain color for wood, the present invention is not limited to this configuration. In alternative embodiments of the present invention, flow 20 may be configured to illustrate steps implemented in creating, selecting, or matching colors besides a stain color for wood. For example, one embodiment of the present invention may be configured to create, select or match colors for other items besides stain color for wood, such as paint for sheetrock walls, paint for concrete walls, paint for plaster walls, paint for ceilings that are smooth, paint for ceilings that are textured, etcetera.

Figure 3A:
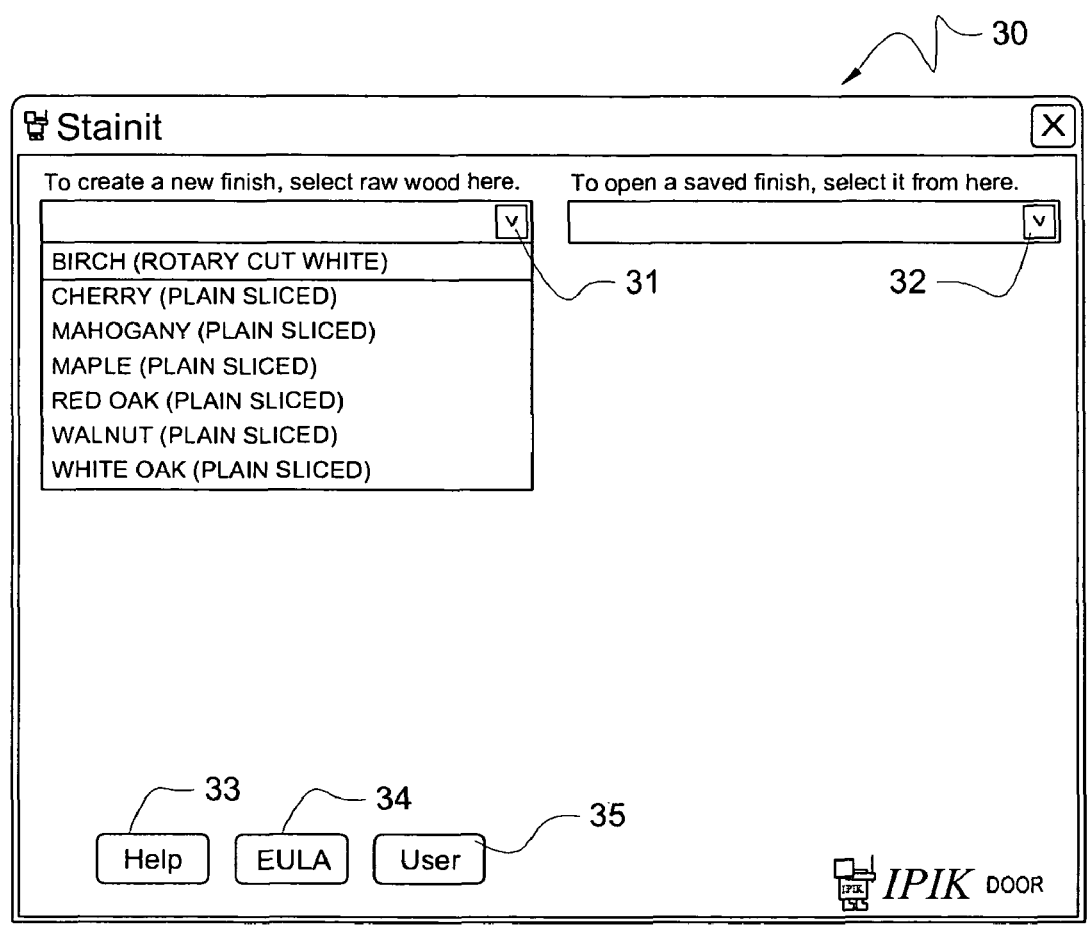
FIG. 3A is a screenshot illustrating an example operation of a system for creating, selecting or matching a stain color for wood, according to one embodiment of the present invention.

FIG. 3A illustrates a screenshot of an example operation performed by one embodiment of the present invention. The screenshots are implemented in IPIK DOOR'S STAINIT™ creation-selection-matching environment. It should be noted that the present invention is not limited in its application to the embodiment illustrated by STAINIT™.

Figure 3B:
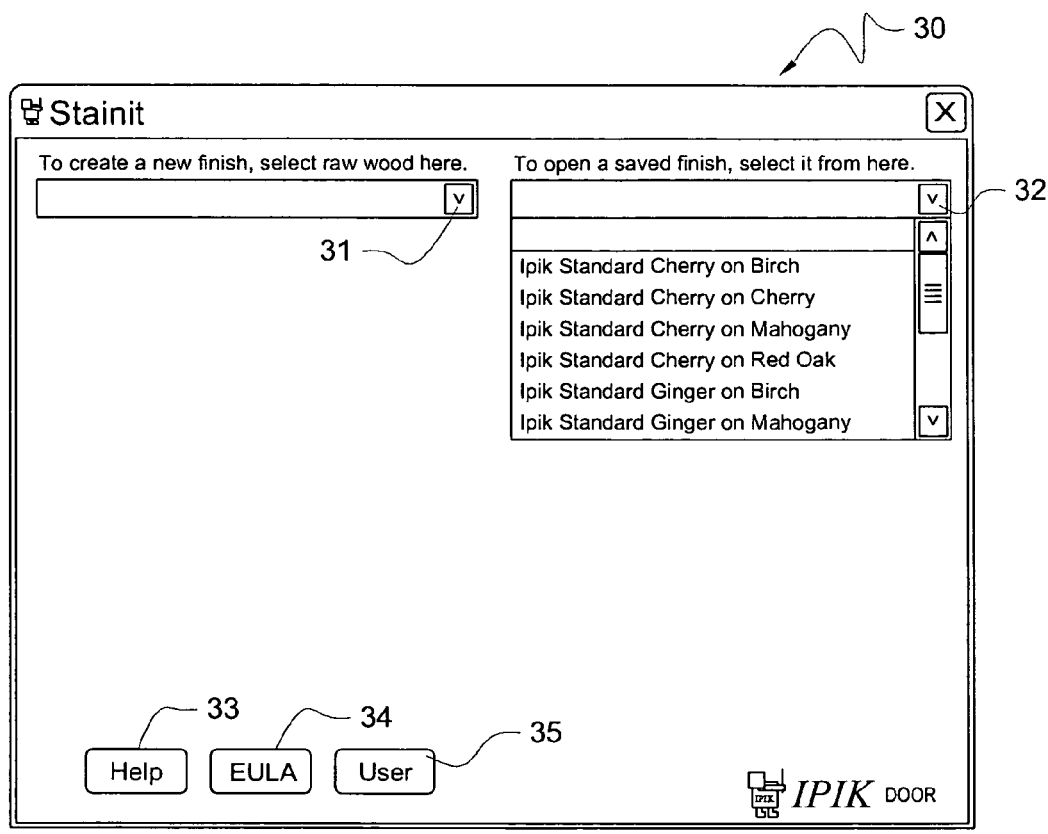
FIG. 3B is a screenshot illustrating an example operation of a system for creating, selecting or matching a stain color for wood, according to one embodiment of the present invention.

FIGS. 3A and 3B illustrate window 30. Window 30 illustrates selection drop down boxes 31 and 32, help selector 33, license selector 34, and user selector 35. Selection drop down box 31 provides a manner in which a user can select a type of raw wood, such as Birch, Cherry, Mahogany, Maple, Red Oak, Walnut, White Oak, etcetera. The present invention is not limited to this list as any number of raw woods may be available for a user to select. Selection drop down box 32 provides a manner in which a user can select a list of saved finishes and/or stain colors, such as Standard Cherry on Birch, Standard Cherry on Cherry, Standard Cherry on Mahogany, Standard Cherry on Red Oak, Standard Ginger on Birch, Standard Ginger on Mahogany, Standard Ginger on Red Oak, Standard Honey on Birch, Standard Honey on Red Oak, Standard Pecan on Birch, Standard Pecan on Red Oak, Standard Pecan on Mahogany, Standard Wine on Birch, Standard Wine on Mahogany, etcetera. The present invention is not limited to this list as any number of finishes and stain colors may be available for a user to select.

Figure 4:
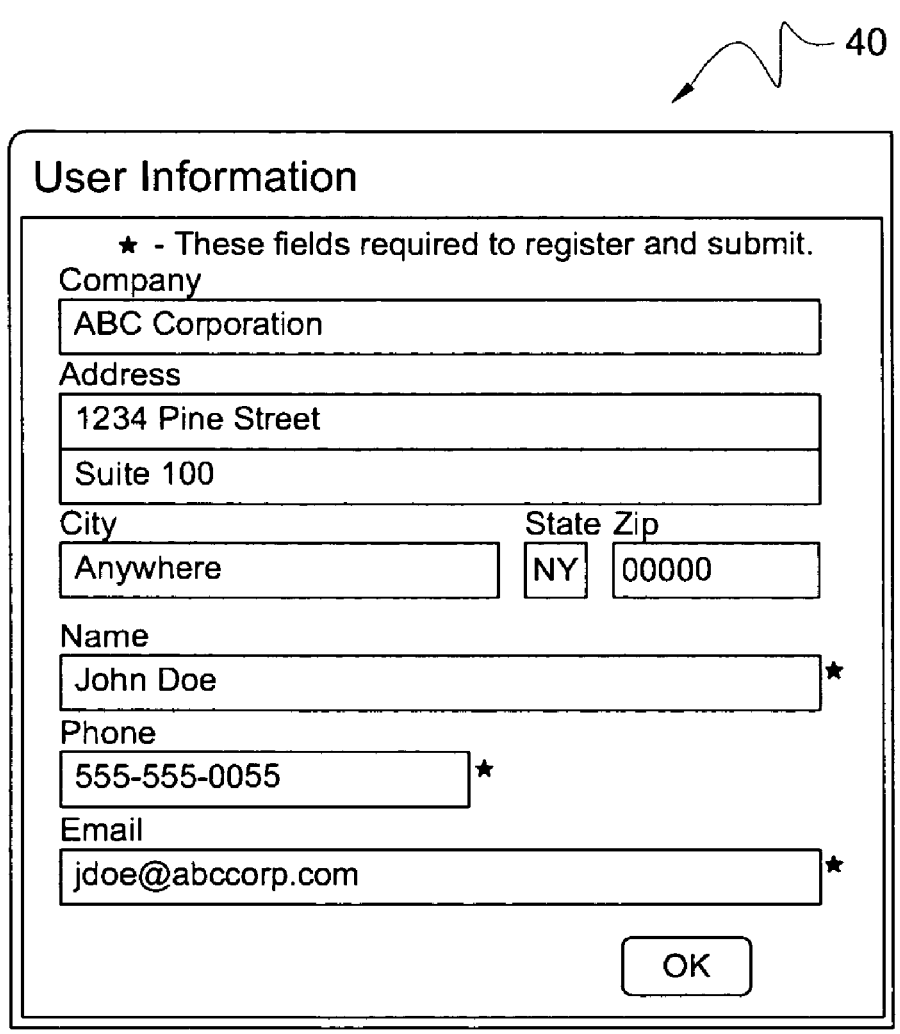
FIG. 4 is a screenshot illustrating an example operation of a system for creating, selecting or matching a stain color for wood, according to one embodiment of the present invention.

Help selector 33 is a manner in which a user can obtain help about the present window. For example, if a new user were not sure how to select a raw wood or finish, the user could activate the help selector to obtain access to a help screen. License selector 34 is a manner in which a user can obtain data regarding the end user license agreement. User selector 35 is a manner in which a user can enter personal information that may be communicated to another if/when a user decides to communicate a created stain to another. FIG. 4 illustrates user information window 40 that is illustrated when user selector 35 is activated. Window 40 provides a manner in which a user can input user data that may be communicated along with a stain color when/if a user communicates a stain color to another, such as a manufacturer that may be using the stain color and user information in manufacturing something for a user.

Figure 5:
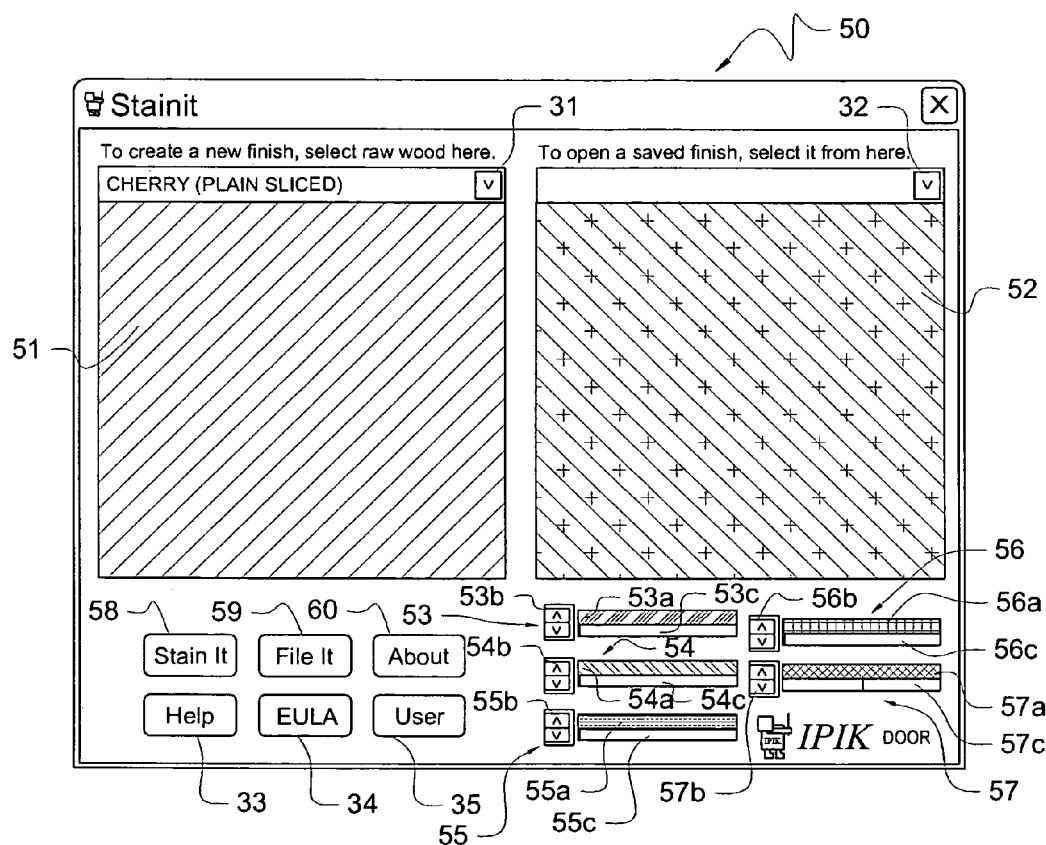
FIG. 5 is a screenshot illustrating an example operation of a system for creating, selecting or matching a stain color for wood, according to one embodiment of the present invention.

FIG. 5 illustrates window 50. Window 50 illustrates wood sample area 51, color mixing area 52, red adjustor 53, green adjustor 54, blue adjustor 55, opacity adjustor 56, intensity adjustor 57, stain activator 58, communicator activator 59, and about activator 60. About activator 60 provides a manner in which a user can obtain general information about the method of creating, selecting or matching a stain color for wood.

Wood sample area 51 displays the selected wood in a raw unfinished state. Color mixing area 52 initially represents the average color of the sample wood. Red adjustor 53, green adjustor 54, and blue adjustor 55 are color adjustor bars that are used to change the color of the stain. Each color adjustor, 53, 54, and 55 includes a color bar 53a, 54a, and 55a that has an up/down spinner button, 53b, 54b, and 55b, and a linear control with a hash mark, 53c, 54c, 55c, showing the relative value of the spinner button. The linear control with a hash mark 53c, 54c, and 55c may be operated by clicking at some point along the hash mark area.

The color bars, 53a, 54a, and 55a represent the direction the color will change as it is modified. As each color is added, the up/down spinner buttons, 53b, 54b, and 55b and the linear controls with a hash mark, 53c, 54c, 55c will also change to reflect the addition of the added color. As the adjustors are modified, colors are added to the color mixing area 52. As a result of the added colors, the color mixing area 52 will change to reflect the addition of the added colors. For example, if red adjuster 53 were adjusted so that the amount of red was increased, the color mixing area will reflect the addition of the red color.

Opacity adjustor 56 includes an opacity bar 56a and an up/down spinner button, 56b with a hash mark, 56c showing the relative value of the spinner. Intensity adjustor 57 also includes an intensity bar 57a and an up/down spinner button, 57b with a hash mark, 57c showing the relative value of the spinner. Similar to the red, green, and blue color adjustors, the linear control for the opacity and intensity adjustors is operated by clicking at some point along the opacity and intensity hash mark area.

The opacity bar 56a represents the effects of adding pigments to the stain, and the intensity bar 57a represent the effects of adding intense dyes to the stain. As the opacity and intensity are modified, the up/down spinner buttons, 56b and 57b, and the linear controls with a hash mark, 56c and 57c will change to reflect the modified opacity and intensity. One embodiment of the present invention is configured so that increasing the opacity imitates the result of adding pigments to the stain and may hide some of the wood grain and figure characteristics of the wood. Adjusting the intensity may imitate the result of adding intense dyes to the stain color. Thus, decreasing the intensity will yield a brighter color and increasing the intensity will yield a darker result. As the opacity and intensity adjustors are modified, the color mixing area 52 will change to reflect the effects of either added or decreased opacity and/or added or decreased intensity.

Stain activator 58 provides a manner in which a user can stain the wood illustrated in wood sample area 51 with the color illustrated in color mixing area 52. In one embodiment of the present invention, after a user is finished adjusting colors and adjusting opacity and intensity, a user can select stain activator 58 which will generate a new image of stained wood that may be displayed in wood sample area 51. In generating the new image, the present invention will generate an image of the original wood after it has been stained with the user created and/or selected color shown in color mixing area 52.

Figure 6:
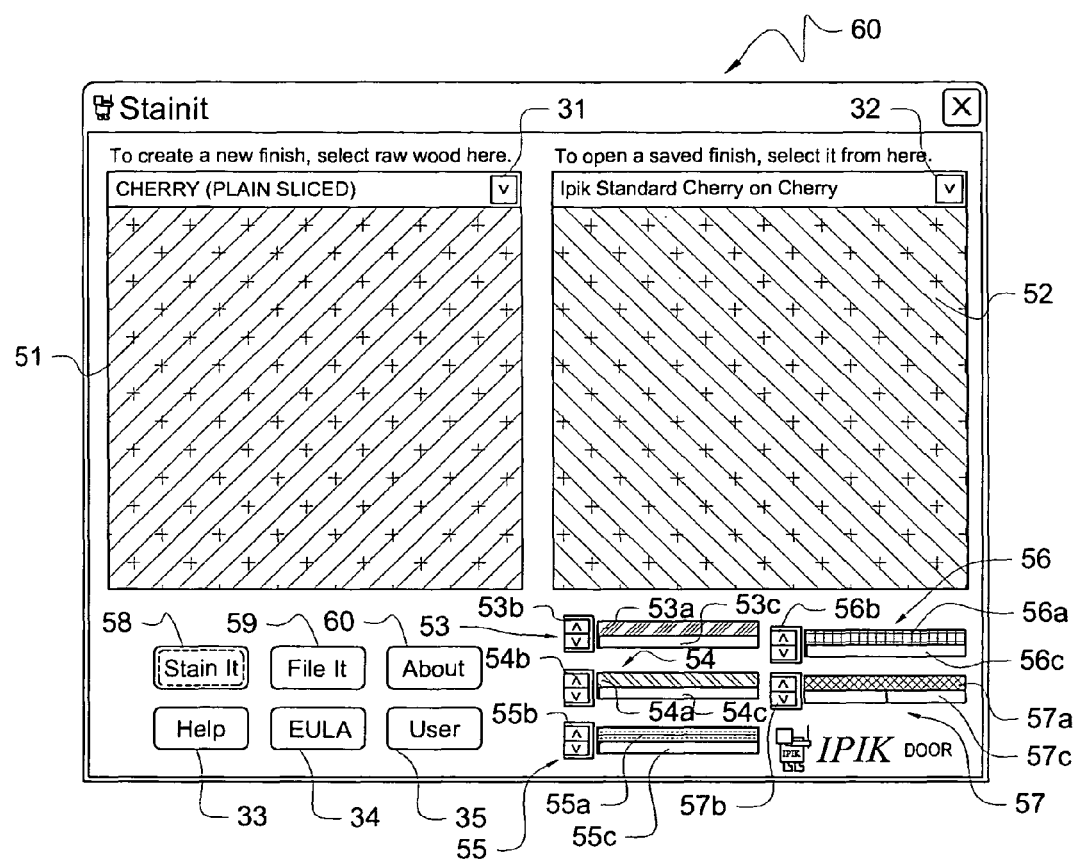
FIG. 6 is a screenshot illustrating an example operation of a system for creating, selecting or matching a stain color for wood, according to one embodiment of the present invention.

FIG. 6 also illustrates window 50 of FIG. 5 whereby wood sample area 51 illustrates the new image of the stained wood. Color mixing area 52 of FIG. 6 illustrates a color created and/or selected by a user, whereby the color is illustrated in FIG. 6 by the plus symbol "+." In FIG. 6, a user has already selected stain activator 58 which resulted in generating an image of the wood stained with the color shown in color mixing area 52. Wood sample area 51 includes the plus symbol "+" throughout the wood sample area 51 to signify that a new image has been created which illustrates the wood stained by the color shown in color mixing area 52.

Figure 7:
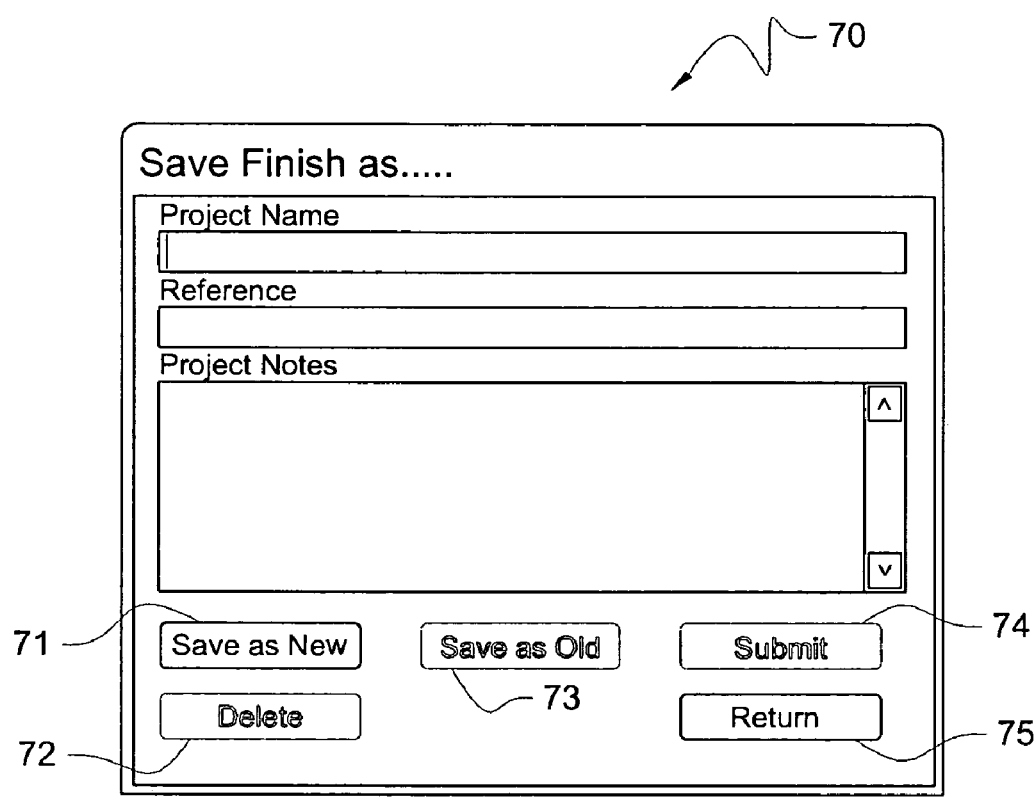
FIG. 7 is a screenshot illustrating an example operation of a system for creating, selecting or matching a stain color for wood, according to one embodiment of the present invention.

Communicator activator 59 of FIGS. 5 and 6 provides a manner in which a user can save his/her created and/or selected stain color or finish. In one embodiment, when a user activates communicator activator 59, a new window 70 pops up as illustrated in FIG. 7. Window 70 includes save as new activator 71, delete activator 72, save as old activator 73, submit activator 74, and return activator 75.

Save as new activator 71 provides a manner in which a user can save a user created and/or selected color and/or wood-color combination as a new color and/or wood-color combination. In selecting the save as new activator 71, the present invention may present the user with an option to save his selection as new file. Delete activator 72 provides a manner in which a user can delete an earlier saved creation. For example, if a user had used the same stain color creation for a long time with a manufacturer in ordering materials from the manufacturer and then decided to change colors, the user may want to delete the creation to assure that the old stain color creation would not be used by the manufacturer by mistake. Save as old activator 73 provides a manner in which a user can save a user created and/or selected color and/or wood-color combination over an earlier saved selection. In selecting the save as old activator 73, the present invention may present the user with an option to overwrite or save his selection over an older or earlier saved selection.

Submit applicator 74 provides a manner in which a user can choose to communicate his/her created and/or selected color and/or wood-color combination to another. In one embodiment of the present invention, a user can activate submit activator 74 and email his/her created and/or selected color and/or wood-color combination to another. For example, a user that orders wood products, such as doors, from a manufacturer can utilize the present invention to create a wood-color combination and then email that wood-color combination to the manufacturer which can then utilize the data to complete the user's order. Return activator 75 provides a manner in which a user can return to the color creating phase or other phase if the user should choose not to communicate his/her creation to another.

Figure 8:
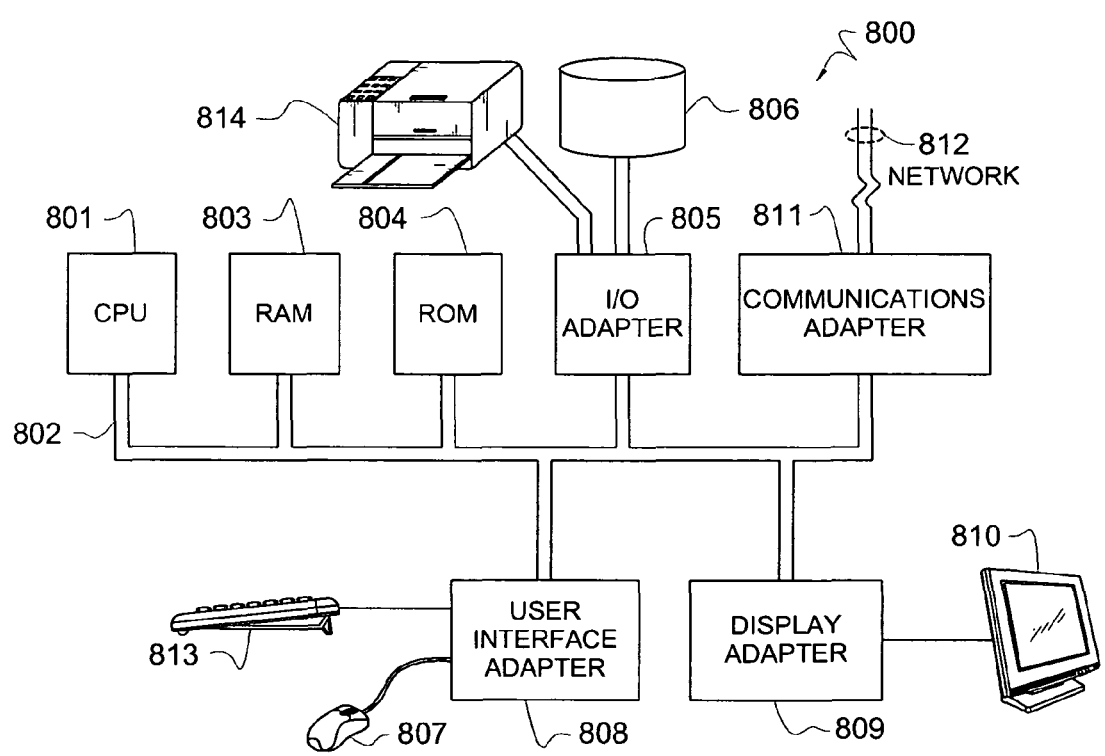
FIG. 8 depicts a block diagram of a computer system which is adapted to use an embodiment of the present invention.

FIG. 8 illustrates computer system 800 adapted to use embodiments of the present invention, e.g. storing and/or executing software associated with the embodiments. Central processing unit (CPU) 801 is coupled to system bus 802. The CPU 801 may be any general purpose CPU. However, embodiments of the present invention are not restricted by the architecture of CPU 801 as long as CPU 801 supports the inventive operations as described herein. Bus 802 is coupled to random access memory (RAM) 803, which may be SRAM, DRAM, or SDRAM. ROM 804 is also coupled to bus 802, which may be PROM, EPROM, or EEPROM. RAM 803 and ROM 804 hold user and system data and programs as is well known in the art.

Bus 802 is also coupled to input/output (I/O) controller card 805, communications adapter card 811, user interface card 808, and display card 809. The I/O adapter card 805 connects storage devices 806, such as one or more of a hard drive, a CD drive, a floppy disk drive, a tape drive, to computer system 800. The I/O adapter 805 is also connected to printer 814, which would allow the system to print paper copies of information such as documents, photographs, articles, etcetera. Note that the printer may be a printer (e.g. dot matrix, laser, etcetera.), a fax machine, scanner, or a copier machine. Communications card 811 is adapted to couple the computer system 800 to a network 812, which may be one or more of a telephone network, a local (LAN) and/or a wide-area (WAN) network, an Ethernet network, and/or the Internet network. User interface card 808 couples user input devices, such as keyboard 813, pointing device 807, etcetera to the computer system 800. The display card 809 is driven by CPU 801 to control the display on display device 810.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for creating a stain color for wood using a processor to perform the following steps:
   illustrating visual information for wood;
   illustrating visual information for a first color;
   adjusting said first color;
   illustrating visual information for a second color in response to said adjusting of said first color;
   analyzing characteristics of said visual information of said wood;
   applying said second color to said wood;

generating new visual information for said wood in response to said applying of said second color to said wood;
automatically adjusting said generated new visual information of said wood to accommodate for said characteristics of said visual information of said wood; and
illustrating said newly generated visual information for said wood.

2. The method of claim 1 further comprising
saving said visual information for said second color.

3. The method of claim 2 further comprising:
communicating said visual information for said second color.

4. The method of claim 1 wherein said illustrating visual information for wood comprises:
providing a selection means whereby a type of wood may be selected;
illustrating visual information in response to selection of a type of wood.

5. The method of claim 1 wherein adjusting said first color comprises:
providing a color adjustment means comprising:
a means for increasing an amount of color;
a means for decreasing an amount of color;
a means for increasing opacity of color;
a means for decreasing opacity of color;
a means for increasing intensity of color; and
a means for decreasing intensity of color.

6. The method of claim 5 wherein said increased amount of color and said decreased amount of color is one or more of:
red;
green;
blue;
yellow;
cyan;
purple;
black; and
white.

7. The method of claim 1 wherein said illustrating visual information for a second color in response to said adjusting comprises:
generating an image of said second color in response to said adjusting.

8. The method of claim 3 wherein said communicating said visual information for said second color comprises:
sending said visual information for said second color in an email.

9. The method of claim 1 further comprising:
adjusting said new visual information for said wood.

10. The method of claim 9 wherein said adjusting said new visual information for said wood comprises:
providing an adjustment means comprising:
a means for selecting a wood finishing option;
applying a selected wood finishing option to said new visual information for said wood; and
generating visual information for said wood in response to said applying of said finishing option to said new visual information for said wood.

11. A system for creating a stain color for wood comprising:
means for illustrating visual information of raw wood;
means for illustrating visual information of a first color;
means for adjusting said first color;
means for illustrating visual information of a second color in response to said adjusting of said first color;
means for analyzing characteristics of said visual information of said raw wood;
means for applying said visual information of said second color to said visual information of said raw wood;
means for generating a new digital image of said raw wood upon application of said visual information of said second color to said visual information of said raw wood;
means for automatically adjusting said generated new digital image to accommodate for said characteristics of said visual information of said raw wood; and
means for illustrating said new digital image of said raw wood.

12. The system of claim 11 further comprising:
means for adjusting said new digital image of said raw wood.

13. The system of claim 12 wherein said means for adjusting said new digital image of said raw wood comprises:
means for selecting a wood finishing option;
means for applying said finishing option to said new digital image of said raw wood;
means for generating a second digital image of said new digital image of said raw wood upon application of said finishing option to said new digital image of said raw wood.

14. The system of claim 11 further comprising:
means for storing said visual information of said second color.

15. The system of claim 14 further comprising:
means for communicating said visual information of said second color.

16. The system of claim 15 wherein said means for adjusting said first color comprising:
means for increasing an amount of color;
means for decreasing an amount of color;
means for increasing opacity of color;
means for decreasing opacity of color;
means for increasing intensity of color; and
means for decreasing intensity of color.

17. The system of claim 16 wherein said means for illustrating visual information of a second color comprises:
means for generating an image in response to adjustments to said first color.

18. The system of claim 17 wherein said characteristics of said visual information of said raw wood are wood grain characteristics associated with said raw wood.

19. A computer readable medium with computer program logic recorded thereon for creating a stain color for wood, said computer program logic comprising:
code for illustrating raw wood;
code for illustrating a first color;
code for adjusting said first color;
code for illustrating an adjusted color derived from said adjusting of said first color;
code for analyzing characteristics of said illustrated raw wood;
code for applying said illustrated adjusted color to said illustrated raw wood;
code for generating a new digital image of said raw wood upon application of said illustrated adjusted color to said illustrated raw wood;
code for automatically adjusting said generated new digital image of said raw wood to accommodate for said characteristics of said illustrated raw wood; and
code for illustrating said new digital image of said raw wood.

20. The computer readable medium of claim 19 wherein said code for illustrating raw wood comprises:
code for selecting a raw wood;
code for illustrating said selected raw wood.

21. The computer readable medium of claim 20 further comprising:
    code for storing said adjusted color.
22. The computer readable medium of claim 21 further comprising:
    code for communicating.
23. The computer readable medium of claim 22 wherein said code for adjusting said first color comprises:
    code for increasing an amount of color;
    code for decreasing an amount of color;
    code for increasing opacity of color;
    code for decreasing opacity of color;
    code for increasing intensity of color; and
    code for decreasing intensity of color.
24. The computer readable medium of claim 22 wherein said code for communicating comprises:
    code for providing a choice to communicate or not to communicate;
    code for communicating said adjusted color, in response to a selection of said choice to communicate.
25. The computer readable medium of claim 21 further comprising:
    code for communicating said stored adjusted color to a third party; and
    code for ordering items implementing said emailed and stored adjusted color.
26. The computer readable medium of claim 21 further comprising:
    code for utilizing said adjusted color to create a wood stain wherein said created wood stain matches said adjusted color.
27. The computer readable medium of claim 19 wherein said characteristics of said data making up said raw wood comprise wood grain characteristics associated with said illustrated raw wood.
28. A computer readable storage medium storing a program for creating a stain color for wood, said program comprising:
    logic for illustrating an image of raw wood;
    logic for illustrating an image of a first color;
    logic for providing a means to adjust said first color;
    logic for illustrating an image of a second color in response to adjusting of said first color; and
    logic for digitally staining said raw wood with said second color wherein said logic for digitally staining said raw wood comprises:
        logic for analyzing characteristics of said image of said raw wood;
        logic for applying said image of said second color to said image of said raw wood;
        logic for generating a new digital image of said raw wood upon application of said image of said second color to said image of said raw wood;
        logic for automatically adjusting said generated digital image to accommodate for said characteristics of said image of said raw wood; and
        means for illustrating said new digital image of said raw wood.
29. The computer readable storage medium of claim 28 further comprising:
    logic for communicating data making up said second color;
    logic for utilizing said communicated data to create a wood stain wherein said created wood stain matches said second color.

* * * * *